UNITED STATES PATENT OFFICE.

ALBERT MACKENSEN, OF DUSSELDORF, GERMANY.

PROCESS OF PRODUCING VEGETABLE PARCHMENT FREE FROM GERMS.

SPECIFICATION forming part of Letters Patent No. 705,687, dated July 29, 1902.

Application filed November 30, 1901. Serial No. 84,260. (No specimens.)

*To all whom it may concern:*

Be it known that I, ALBERT MACKENSEN, a citizen of the German Empire, residing at Dusseldorf, in the Province of Rhineland and Kingdom of Prussia, Germany, have invented a new and useful Process of Producing Vegetable Parchment, of which the following is a specification.

Vegetable parchment (parchment-paper) which has up to the present been placed on the market possesses the disadvantage that it is not free from germs and can still less remain free from the same when in use, as in the process of manufacture germ-producers, such as glycerin and grape-sugar, are used to render it soft and pliable. Manufacturers of vegetable parchment besides aiming at a remedy for this evil are also anxious to produce a parchment as white as possible. Both these objects are attained by the process hereinafter described. The said process consists in adding a considerable quantity of boracic acid to the parchment during manufacture. The whiteness and freedom from germs of the final product will of course be the more perfect the greater the quantity of the boracic acid added. This admixture of boracic acid is effected in the glycerin-bath through which the parchment is drawn before it comes onto the drying-rollers. In one hundred parts of boiling glycerin sixty parts of boracic acid are dissolved, the result after the solution has cooled being a wax-like mass which will immediately dissolve in the glycerin-bath in any proportion. It is obvious that vegetable parchment containing a very large proportion of boracic acid can thus be produced which in accordance with the properties of the said acid will be both free from germs and of white color.

Having fully described my invention, what I desire to claim and secure by Letters Patent is—

The process of treating vegetable parchment, which consists in dissolving boracic acid in boiling glycerin, cooling the mixture to form a wax-like mass, dissolving said mass in a glycerin-bath, and drawing the parchment through said bath, substantially as specified.

In testimony that I claim the foregoing as my invention I have signed my name in presence of two subscribing witnesses.

ALBERT MACKENSEN.

Witnesses:
WM. ESSENWEIN,
P. LIEBER.